(12) United States Patent
Kato et al.

(10) Patent No.: US 7,052,803 B2
(45) Date of Patent: May 30, 2006

(54) LITHIUM RECHARGEABLE BATTERY

(75) Inventors: Fumio Kato, Kadoma (JP); Takafumi Oura, Shijonawate (JP); Yusuke Fukumoto, Moriguchi (JP); Norihiro Yamamoto, Katano (JP); Shozo Fujiwara, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 10/620,687

(22) Filed: Jul. 17, 2003

(65) Prior Publication Data
US 2004/0023115 A1 Feb. 5, 2004

(30) Foreign Application Priority Data
Jul. 31, 2002 (JP) .............................. 2002-223862

(51) Int. Cl.
  *H01M 4/58* (2006.01)
  *H01M 4/62* (2006.01)
  *H01M 4/66* (2006.01)
(52) U.S. Cl. ................... 429/231.8; 429/217; 429/245
(58) Field of Classification Search ............. 429/231.8, 429/217, 245
See application file for complete search history.

(56) References Cited

U.S. PATENT DOCUMENTS

| | | | | |
|---|---|---|---|---|
| 5,700,298 A | * | 12/1997 | Shi et al. .................... 29/623.1 |
| 6,344,296 B1 | * | 2/2002 | Ishii et al. ................ 429/231.8 |
| 6,403,259 B1 | * | 6/2002 | Kitagawa et al. ........ 429/231.4 |
| 6,576,369 B1 | * | 6/2003 | Moriguchi et al. ...... 429/231.8 |
| 6,660,434 B1 | * | 12/2003 | Barsukov et al. ........... 429/232 |

FOREIGN PATENT DOCUMENTS

| | | | |
|---|---|---|---|
| JP | 05290844 A | * | 11/1993 |
| JP | 07153486 A | * | 6/1995 |
| JP | 11-54123 | | 2/1999 |
| JP | 11-199213 | | 7/1999 |
| JP | 11-263612 | | 9/1999 |
| JP | 2000-90930 | | 3/2000 |
| JP | 2000251890 A | * | 9/2000 |
| JP | 2001-23635 | | 1/2001 |
| JP | 2001-76731 | | 3/2001 |
| JP | 2001-89118 | | 4/2001 |
| JP | 2001-236950 | | 8/2001 |
| JP | 2001-357849 | | 12/2001 |
| JP | 2002-50346 | | 2/2002 |

* cited by examiner

*Primary Examiner*—Gregg Cantelmo
(74) *Attorney, Agent, or Firm*—McDermott Will & Emery LLP

(57) ABSTRACT

The present invention provides a lithium rechargeable battery including a negative electrode comprising a copper core material, to which is fixed an active material made by mixing artificial graphite particles A obtained by kneading and granulating a base material of pulverized bulk mesophase pitch with pitch in a softened state and/or thermosetting resin, carbonizing the resulting granules at 700 to 1,500° C. and graphitizing the carbonized granules at 2,500 to 3,000° C. with spherical graphite particles B having a high mean circularity, with a view to inhibiting the deterioration in battery capacity through the repeated charge/discharge cycles, which occurs remarkably in a high energy density lithium rechargeable battery, and providing excellent discharge characteristic and safety.

7 Claims, 1 Drawing Sheet

LITHIUM RECHARGEABLE BATTERY

BACKGROUND OF THE INVENTION

As electronic equipment becomes portable and wireless, compact and lightweight lithium rechargeable batteries having high energy density are being expected as a promising driving power source. For example, there is a so-called rocking chair type lithium ion rechargeable battery comprising a negative electrode using as an active material a carbon material capable of reversibly intercalating and deintercalating lithium ions, a positive electrode using a lithium-containing transition metal complex oxide as an active material, a separator and a non-aqueous electrolyte. This battery has already been placed into practical use and is rapidly spreading.

As the active material for the negative electrode, graphite particles having higher crystallinity among various carbon materials have recently been prevailed for the following reasons: (1) electronic conductivity is high and discharge performance under a large current becomes excellent; (2) variations in potential accompanying discharge become small, which is suitable for discharge under constant electric power; and (3) a true density is high and hence a bulk density becomes high, which is suitable for making the energy density of the battery higher.

The graphite materials which are now under development or consideration for the negative electrode of the lithium rechargeable battery are mainly as follows:

(I) massive natural graphite particles prepared by making flake-like particles spherical in a process of pulverizing crude ore;

(II) artificial graphite particles prepared by graphitizing a certain kind of coke or granules made of coke and various pitches; and (III) special artificial graphite particles derived from mesophase carbon (a kind of liquid crystal) generated by heating pitch or tar, examples of which are (1) a material prepared by carbonizing and graphitizing an extract of mesophase microspheres (graphitized mesocarbon microbeads: abbreviated as graphitized MCMB), (2) a material prepared by spinning fused mesophase pitch formed by polymeric growth of the mesophase microspheres, oxidizing the surface to make it infusible, followed by carbonizing, cutting, pulverizing and graphitizing (milled graphite fibers or graphitized milled mesocarbon pitch-based fibers: abbreviated as graphitized milled-MCF) and (3) a material prepared by carbonizing and graphitizing pulverized bulk mesophase pitch which is less fusible and formed by polymeric growth of the mesophase microspheres (graphitized bulk mesophase pitch).

Various attempts have been made to give high performance to the above-described graphite materials in view of a recent demand for the high energy density lithium rechargeable battery. Since the natural graphite particles of item (I) are capable of showing reversible capacity close to a theoretical capacity of graphite (372 mAh/g), research has eagerly been carried out on adjustment of the particle form suitable for filling the particles in an electrode in high density. Further, as described in Japanese Laid-Open Patent Publication No. HEI 11-54123, an edge surface exposed on the graphite particle surface is covered with amorphous carbon, which is classified as easily graphitizing carbon, to reduce irreversible capacity accompanying electrolyte decomposition caused on the surface of the graphite particles at the initial charge. On the other hand, the artificial graphite particles of items (II) and (III) are currently not capable of showing reversible capacity close to the theoretical capacity of graphite (poor in reversible capacity as compared with the natural graphite). Therefore, attempts have aggressively been made to enhance the degree of graphitization of the particles and to improve the reversible capacity by increasing purity of raw materials such as coke, pitch and tar, optimizing the graphitizing conditions in accordance with the materials, or adding a catalyst for promoting the graphitization. In such artificial graphite materials, the edge surface exposed on the particle surface is small in area, and hence in many cases the irreversible capacity at the initial charge is generally smaller than that of the natural graphite of item (I).

In the actual production of the negative electrode of the lithium rechargeable battery, one or a mixture of two or more of the above-described graphite materials may be used as the active material. In general, to the graphite particles used as the active material, SBR (styrene-butadiene copolymer rubber) or the like as a binder, CMC (carboxymethyl cellulose) or the like as a thickener and water are added in an appropriate amount to prepare an aqueous paste. Or alternatively, PVDF (polyvinylidene fluoride) or the like as the binder/the thickener and NMP (N-methyl-2-pyrrolidone) or the like as a dispersion medium are added in an appropriate amount to the graphite particles to prepare an organic paste. This paste is applied to a copper core material, which is dried and rolled to have a desired thickness and density. The resulting product is then subjected to cutting and a lead is welded to the core material, thereby obtaining a negative electrode plate. In many cases, the upper limit of the density of the negative electrode material mixture layer is set at about 1.6 $g/cm^3$ in view of the degree of crush or collapse of the negative electrode active material particles while rolling the layer in high density, as well as the degree of falling or peeling of the particles off the core material. Even so, a lithium rechargeable battery having an energy density by volume as high as over 350 Wh/L can be obtained by combining the negative electrode with a positive electrode mainly containing $LiCoO_2$ as the active material and being rolled in high density and a separator made of a thin porous film of polyolefin having appropriate mechanical strength and porosity.

Since portable equipment can easily be designed to be compact and thin in recent years, there are growing needs for a high energy density lithium rechargeable battery with added values of "thin and lightweight", in which a negative electrode, a positive electrode and a separator are generally wound in the form of an almost rectangular column or an elliptic cylinder to form an electrode group, the electrode group is sealed in a prismatic metal case or a case made of an aluminum foil/resin film laminate and a non-aqueous electrolyte is poured therein.

There are various capabilities that are required for the above-described lithium rechargeable battery. In view of obtaining much higher energy density, generally adopted is a method of rolling the negative electrode material mixture layer formed on the copper core material in higher density (more specifically, about 1.6 to 1.8 $g/cm^3$ as the density of the coated negative electrode material mixture layer including the binder and the like). However, since the true density of graphite is 2.22 to 2.24 $g/cm^3$, the density of the mixture layer exceeding 1.6 $g/cm^3$ represents a state in which the mixture layer is rolled in extremely high density. Therefore, in the step of rolling the coated negative electrode material mixture layer with a roller or the like, problems are apt to occur, e.g., the mixture layer cannot be rolled down to a predetermined thickness, and the falling or peeling of the mixture layer off the core material becomes manifest.

Such problems often result from the kind of graphite particles used as the negative electrode active material. In light of the inventors' empirical rule, the special artificial graphite particles of item (III) derived from mesophase carbon are liable to cause the former problem, i.e., the negative electrode material mixture layer cannot be rolled in high density. Further, the artificial graphite particles of item (II) derived from coke and the like are apt to cause the latter problem of falling or peeling of the mixture layer off the core material. As to the special artificial graphite particles of item (III) derived from mesophase carbon, poor slippage between the particles is considered as a cause of the problem. For the purpose of alleviating fusion of the particles in the steps of carbonization and graphitization, it is necessary to give the mesophase particles treatment for making their surface layers infusible (mild oxidation treatment). The resulting surface layers of the particles are in an amorphous state where the graphitization is not proceeding so much. That is, the state of contact among the artificial graphite particles (III) as the active material in the negative electrode material mixture layer is substantially that of amorphous carbon. The amorphous carbon having no layer structure causes less electrostatic repulsion between particles (interaction between $\pi$ electrons), which is a phenomenon unique to the layer structure of graphite, and hence is poor in slippage. Therefore, if such materials are used as the negative electrode active material, the problem is apt to occur, i.e., the resulting negative electrode material mixture layer cannot be rolled in high density. As a solution to the problem, for example, Japanese Laid-Open Patent Publication No. 2001-236950 proposes a technique for forming the negative electrode material mixture layer by adding massive natural graphite particles or flake-like natural graphite particles as an auxiliary material to the graphitized MCMB.

The artificial graphite particles of item (II) derived from coke and the like are generally formed by graphitization and subsequent pulverization for adjusting the particle size. In many cases, it is difficult to obtain particles having a high bulk density (or a tap density) or a small specific surface area. This is considered to be a cause of the peeling and falling of the mixture layer while rolling the mixture layer in high density. That is, the particles are crushed or collapsed through the rolling of the mixture layer in high density because of the bulkiness of the particles. Further, most of the binder added to the mixture layer is adsorbed onto the particle surfaces because of the high specific surface area of the particles. Therefore, the binding state between the core material and the particles or between the particle and particle cannot be well maintained. For this reason, it is inferred that the falling and peeling of the mixture layer is apt to occur while rolling the layer in high density.

As compared with the above artificial graphite particles, the natural graphite particles of item (I) are basically graphitized enough to the surface layer, and hence show strong electrostatic repulsion between particles and extremely high slippage. Therefore, the rolling of the mixture layer in as high density as over 1.6 g/cm$^3$ is relatively easy and problems accompanying the production are hard to arise. However, as described in Japanese Laid-Open Patent Publication No. HEI 11-263612, it is very difficult to shape the whole particles into almost complete spheres even if treatment is given to convert the flake-like particles into massive (spherical) ones. As a matter of fact, a large number of spindle-shaped (flat) particles having considerably large aspect ratio are included. Accordingly, in the case where the rolling is performed to such a degree that the density of the mixture layer exceeds 1.6 g/cm$^3$, there occurs a phenomenon in which the spindle-shaped particles are oriented in a plane direction of the core material while involving partial deformation of the particles (a phenomenon which is well known with the conventional flake-like natural graphite particles), though it depends on the degree of the control of the particle shape. As a result, characteristic problems may occur, for example: (1) the edge surface of the graphite particle through which Li ions are intercalated and deintercalated is hard to expose to the electrolyte, which decreases the diffusibility of the Li ions and deteriorates a high rate discharge characteristic; and (2) expansion and contraction in the c-axis direction of the graphite particles during charge and discharge are apt to be reflected as the change in thickness of the mixture layer (the degree of expansion and contraction of the electrode is great).

Thus, in the step of rolling the mixture layer in high density, the natural graphite particles are oriented (i.e., graphite crystal forming the particles is oriented) and the electrode performance is deteriorated. Taking this problem into consideration, Japanese Laid-Open Patent Publications Nos. 2001-89118 and 2002-50346 propose a technique of mixing a graphitizable raw material (mostly coke and the like) with a graphitizable binder (tar or pitch), carbonizing the mixture, followed by pulverization and graphitization to prepare artificial graphite in which graphite structure or crystal is oriented at random, and applying the resulting artificial graphite to a negative electrode of a lithium rechargeable battery. Similar to this technique, for example, Japanese Laid-Open Patent Publication No. 2001-357849 describes that kish graphite (recrystallized graphite) obtained in a steel-making process is granulated with a binder, which is graphitized and used in the negative electrode. With the thus obtained artificial graphite particles, the problem of falling and peeling of the mixture layer is apt to occur. However, the graphite crystal existing at random in the particles is not affected even if the particles are oriented in the plane direction of the core material during rolling the electrode in high density. Therefore, it is relatively easy to avoid the above-described problems (1) and (2).

In a recent lithium ion rechargeable battery designed to have as high energy density as over 350 Wh/L, the negative and positive electrode active materials need to be filled in a larger amount in a battery case of a predetermined volume. Accordingly, remaining space in the battery (internal volume of the battery case from which volumes of the positive and negative electrodes, the separator and the like are subtracted) is reduced, which extremely decreases the ratio (cc/mAh) of the electrolyte amount to the designed battery capacity. As a result, the electrolyte does not permeate sufficiently into the inside of the negative electrode mixture layer rolled in high density, which deteriorates a high rate charge/discharge characteristic and a discharge characteristic at low temperature. This problem has not been caused in a conventional battery containing the electrolyte in a relatively large amount. A solution to this problem, which is partially disclosed by Japanese Laid-Open Patent Publication No. 2000-90930, is the use of, as the negative electrode active material, graphite particles being capable of maintaining an appropriate mean circularity (sphericity) even after the rolling (pressure molding), having a certain average particle diameter (10 to 35 µm), containing a less amount of fine powder which has a diameter of 4 µm or less and showing relatively sharp particle size distribution. Therefore, the natural graphite particles made into massive (spherical) as described above or the artificial graphite particles in which the graphite crystal is oriented at random may be used with less deterioration in high rate charge/discharge characteristic and discharge characteristic at low temperature if their particle sizes are optimally adjusted.

Even so, the lithium rechargeable battery designed to have high energy density has another problem, i.e., the reduction in capacity through the charge/discharge cycles is caused greater than in the conventional battery. Causes thereof are considered as follows. If the graphite particles used as the negative electrode active material are crushed or collapsed through the charge/discharge cycles, an edge surface of the crushed particles is exposed to the electrolyte to decompose and consume the electrolyte whose absolute amount is small from the start. As a result, the internal resistance of the battery increases. Further, a product generated through the electrolyte decomposition is deposited as a membrane on the negative electrode surface, which decreases the charge/discharge efficiency of the negative electrode.

In addition, regarding the high energy density lithium rechargeable battery of the latest-type formed by winding a positive electrode, a negative electrode and a separator into an electrode group in the form of an almost rectangular column or a elliptic cylinder, sealing the electrode group in a prismatic metal case or an aluminum foil/resin film laminate case and pouring therein a non-aqueous electrolyte, the battery case is generally low in strength. Accordingly, once the decomposition of the electrolyte occurs through the repeated charge/discharge cycles, cracked gas is generated to raise the internal pressure of the battery, thereby the battery is deformed (swelled) in a thickness direction. Further, the electrode group wound in the form of an almost rectangular column or an elliptic cylinder is more liable to be deformed through the expansion and contraction of the negative electrode material mixture than an electrode group wound into the form of a cylinder (wound in a spiral fashion) used in a cylindrical battery. These factors conspire to drastically reduce a cycle life characteristic of the battery.

It is possible to assume that the cycle life characteristic of the lithium ion rechargeable battery designed to have a high energy density is deteriorated in accordance with the above-described mechanism. Thus, a possible measure for improvements is to use, as the negative electrode active material, (1) graphite particles which are hard to crush or collapse through the charge/discharge cycles (poor in reactivity with the electrolyte during the charge/discharge cycles) with a view to inhibiting the decomposition and consumption of the electrolyte and (2) graphite particles which do not expand or contract to a great extent during the charge/discharge cycles. As a result of intensive study on various graphite materials performed by the inventors of the present invention, it was found that the massive natural graphite particles (or those subjected to surface reforming or surface coating) used as the negative electrode active material were crushed or collapsed through the charge/discharge cycles to a greater extent than the artificial graphite particles. Even in a system where the electrolyte was added with a currently known additive for forming a protective membrane on the negative electrode at the initial charge to inhibit the electrolyte decomposition through the charge/discharge cycles (a typical example of the additive is vinylene carbonate), a satisfactory cycle life characteristic was not obtained. It was also found that the above-described artificial graphite particles containing the graphite crystal oriented at random were favorable because the degree of crush or collapse of the particles through the charge/discharge cycles was small, as well as the degree of the expansion and contraction through the charge/discharge cycles was relatively small.

On the other hand, the artificial graphite particles made by the technique disclosed in Japanese Laid-Open Patent Publications Nos. 2001-89118 and 2002-50346 are firmly fused with each other in the steps of carbonization and graphitization during the manufacture thereof. Therefore, intense pulverization is required after the graphitization. As a result, the obtained graphite particles become large in specific surface area. The specific surface area of the graphite particles in the negative electrode is empirically known to have a correlation with the initial irreversible capacity and the thermal stability (heat resistance under the charged state) of the negative electrode. If the particles have a large specific surface area, the initial irreversible capacity increases and the thermal stability decreases. Therefore, it is unfavorable in view of giving high capacity and stability to the battery.

Considering the above, Japanese Laid-Open Patent Publication No. HEI 11-199213 discloses a method of manufacturing artificial graphite by mixing a graphitizable raw material (coke) and a graphitizable binder (tar or pitch), carbonizing the mixture, slightly pulverizing the carbonized mixture and graphitizing the resulting powder (i.e., the pulverization is carried out before the graphitization). The publication also discloses that the specific surface area of the particles is reduced to 1.0 to 3.0 $m^2/g$ by: (1) making the mixture infusible before the carbonization by oxidizing the binder; (2) adding thermosetting resin to the binder to prevent fusion of the particles during the carbonization; or (3) coating the mixture of the raw material and the binder with thermosetting resin. Further, according to the embodiments, is described an example of preparation of artificial graphite particles having an average particle diameter ($D_{50}$) of 25 to 30 μm and a specific surface area of 1.8 to 2.2 $m^2/g$ measured by a BET method.

However, as long as specific starting materials (coke, tar and pitch in the case of the above-described publication) are used, there is a limitation in reducing the specific surface area of the particles. For example, if $D_{50}$ (25 to 30 μm) of the graphite particles according to the embodiment of the above-described publication is slightly reduced to about 20 μm to alleviate the settlement of the negative electrode material mixture paste (to make the paste easy to handle during the manufacture so as to increase yield), the BET specific surface area exceeds 3 $m^2/g$. Thereby, the negative electrode increases in initial irreversible capacity and deteriorates in thermal stability (heat resistance). Further, the graphite particles of the above-described publication are smaller in bulk density (or tap density) than the other graphite particles. That is, the graphite particles have another disadvantage that the negative electrode material mixture layer easily falls off the core material while being rolled into a high density electrode, and hence are susceptible to improvement also in this point.

BRIEF SUMMARY OF THE INVENTION

In view of the above-described problems, the present invention provides a lithium rechargeable battery including a negative electrode comprising a copper core material, to which is fixed an active material comprising a mixture of artificial graphite particles A obtained by kneading and granulating a base material of pulverized bulk mesophase pitch with pitch in a softened state and/or thermosetting resin, carbonizing the resulting granules at 700 to 1,500° C.

and graphitizing the carbonized granules at 2,500 to 3,000° C. and spherical graphite particles B having a high mean circularity.

The artificial graphite particles A used as a main negative electrode active material of the present invention are greatly different from those of Japanese Laid-Open Patent Publications Nos. 2001-89118, 2002-50346 and HEI 11-199213 in that the pulverized bulk mesophase pitch which is less fusible and is formed by polymeric growth of mesophase microspheres is used as the base material (a graphitizable raw material). In relation to the pulverized bulk mesophase pitch, Japanese Laid-Open Patent Publication No. 2001-23635 discloses an advantageous feature that the pulverized bulk mesophase pitch formed with a small volatile content does not cause the fusion of the particles in the steps of carbonization and graphitization, which eliminates the need of the subsequent pulverization step. Therefore, graphite particles having a small specific surface area for the negative electrode of a lithium rechargeable battery can be manufactured with high yield.

The artificial graphite particles A used for the negative electrode of the lithium rechargeable battery of the present invention are prepared by using the less fusible pulverized bulk mesophase pitch as the base material and pitch and/or thermosetting resin which is less fusible in the later steps as a binder in the kneading and granulating step. Also in this case, the particles are not fused so much in the steps of carbonization and graphitization, which eliminates the need of the subsequent pulverization step. Therefore, the thus obtained artificial graphite particles A are considered as most favorable from the viewpoint of improvement in cycle life characteristic and safety (heat resistance of the negative electrode) of the high energy density lithium rechargeable battery. That is, the obtained artificial graphite particles include graphite crystal oriented at random, have a small specific surface area and are less liable to be crushed or collapsed through the charge/discharge cycles. Since the bulk mesophase pitch as the base material is easy to graphitize, graphite layer structure is developed more smoothly during the graphitization than coke (needle-like coke which is considered to allow particularly smooth graphitization). Therefore, the artificial graphite particles A are obtained as an active material of higher capacity.

The artificial graphite particles A as described above are apt to become larger in bulk density (or tap density) than graphite particles based on a raw material of the above-described coke. Accordingly, into the artificial graphite particles A which have become relatively large in particle size through the granulating step, an appropriate amount of spherical graphite particles B having a high mean circularity are mixed to fill space in the graphite particles A, thereby preparing the negative electrode active material, which is then applied to the copper core material. According to this method, the particles are filled in the highest density and slippage owing to the electrostatic repulsion is given to the whole particles due to the added graphite particles B. Therefore, the mixture layer hardly falls off the core material even if being rolled to have a high density exceeding 1.6 g/cm$^3$. Also in terms of permeability of the high density negative electrode to the electrolyte, the negative electrode obtained in this manner is extremely favorable for the lithium rechargeable battery.

The artificial graphite particles A used in the present invention are apt to be superior to graphite particles based on coke and special artificial graphite particles derived from general mesophase carbon in terms of acceptance of Li ions under a high rate charging state and a charging state at low temperatures. Therefore, for example, the artificial graphite particles A are expected to cause a secondary effect of being excellent in high rate charge/discharge cycle characteristic at low temperatures.

As described above, the present invention provides a lithium rechargeable battery comprising a positive electrode, a negative electrode and a non-aqueous electrolyte, wherein the negative electrode comprises a copper core material and a negative electrode material mixture layer fixed on the core material, and the negative electrode material mixture layer includes an active material comprising a mixture of artificial graphite particles A and spherical graphite particles B. The artificial graphite particles A are isotropic artificial graphite particles including graphite structure oriented at random and have: (1) an interplanar spacing $d_{002}$ between the (002) planes obtained by a powder X-ray diffraction method being not more than 3.362 Å; (2) a ratio $I_{002}/I_{110}$ of the peak intensity $I_{002}$ attributed to the (002) plane to the peak intensity $I_{110}$ attributed to the (110) plane, which are found from a diffraction pattern obtained by X-ray diffraction of the artificial graphite particles A molded into a pellet of 1.6 g/cm$^3$ in density, being not more than 1,000; (3) a mean circularity of the particles being 0.85 to 0.95; (4) a particle diameter $D_{50}$ corresponding to a volume fraction of 50% measured by a laser diffraction particle size distribution analyzer being 15 to 30 μm, and a ratio $D_{10}/D_{90}$ of a particle diameter $D_{10}$ corresponding to a volume fraction of 10% to a particle diameter $D_{90}$ corresponding to a volume fraction of 90% being 0.2 to 0.5; (5) a tap density after tapping of 900 times with a stroke length of 18 mm being not less than 1 g/cm$^3$; and (6) a specific surface area measured by a BET method being not more than 1 m$^2$/g.

On the other hand, the spherical graphite particles B have: (1) a mean circularity of the particles being 0.88 to 1; (2) a particle diameter $D_{50}$ corresponding to a volume fraction of 50% measured by a laser diffraction particle size distribution analyzer being 5 to 15 μm; (3) an interplanar spacing $d_{002}$ between the (002) planes obtained by a powder X-ray diffraction method being not more than 3.357 Å; and (4) a specific surface area measured by a BET method being not more than 8 m$^2$/g.

The artificial graphite particles A are obtained by kneading and granulating a base material of pulverized bulk mesophase pitch with pitch in a softened state and/or thermosetting resin, carbonizing the resulting granules at 700 to 1,500° C. and graphitizing the carbonized granules at 2,500 to 3,000° C.

The content of the spherical graphite particles B in the active material is preferably 5 to 45 wt %.

It is preferred that the positive electrode and the negative electrode with a separator interposed therebetween are wound to form an electrode group, and the electrode group is sealed in a prismatic metal case or a case made of a laminate of an aluminum foil and a resin film.

It is preferred that the negative electrode material mixture layer further includes a rubber-like binder containing a butadiene unit and a cellulose-based thickener.

The spherical graphite particles B are preferably natural graphite particles and/or natural graphite particles partially subjected to reforming treatment to make only their surfaces amorphous.

Further, it is preferred that the rubber-like binder is added in an amount of not more than 3 parts by weight with respect to the active material of 100 parts by weight, and the negative electrode material mixture layer has a density of 1.6 to 1.8 g/cm$^3$ and a thickness of 40 to 100 μm.

The artificial graphite particles A for preparing a negative electrode material mixture which can be rolled in high density have a certain physical property measured by a micro compression testing machine. The property is measured in the following manner.

First, the artificial graphite particles A, PVDF and NMP are mixed to prepare slurry. In the slurry, contents of the artificial graphite particles A, PVDF and NMP are preferably 40 to 60 wt %, 2 to 12 wt % and 38 to 58 wt %, respectively. The slurry is then coated on a substrate by using a doctor blade with a predetermined gap kept between the substrate and the doctor blade and the resulting mixture layer is compressed by a micro compression testing machine. The greater the layer thickness varies after the compression, the more easily the rolling of graphite is performed.

An example of how the variation is measured is detailed below.

First, 45 parts by weight of artificial graphite particles A, 5 parts by weight of PVDF and 50 parts by weight of NMP are mixed to prepare slurry. The slurry is coated on an electrolytic copper foil (10 μm in thickness) spread on a glass plate using a doctor blade with a gap of 135 μm kept between the copper foil and the doctor blade. Then, the coated layer is dried in a drier at 80° C. The thickness of the dried layer is reduced to about 100 μm, for example. Then, an indenter having a diameter of 500 μm is attached to the micro compression testing machine to impose a load of 200 gf on the dried layer, thereby measuring the variation in layer thickness (compressed amount). Artificial graphite particles A showing the variation in layer thickness of 25 μm or more as measured by this method will give a negative electrode material mixture which can be rolled in high density.

As the micro compression testing machine, MCTM-500 manufactured by Shimadzu Corporation may be used.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
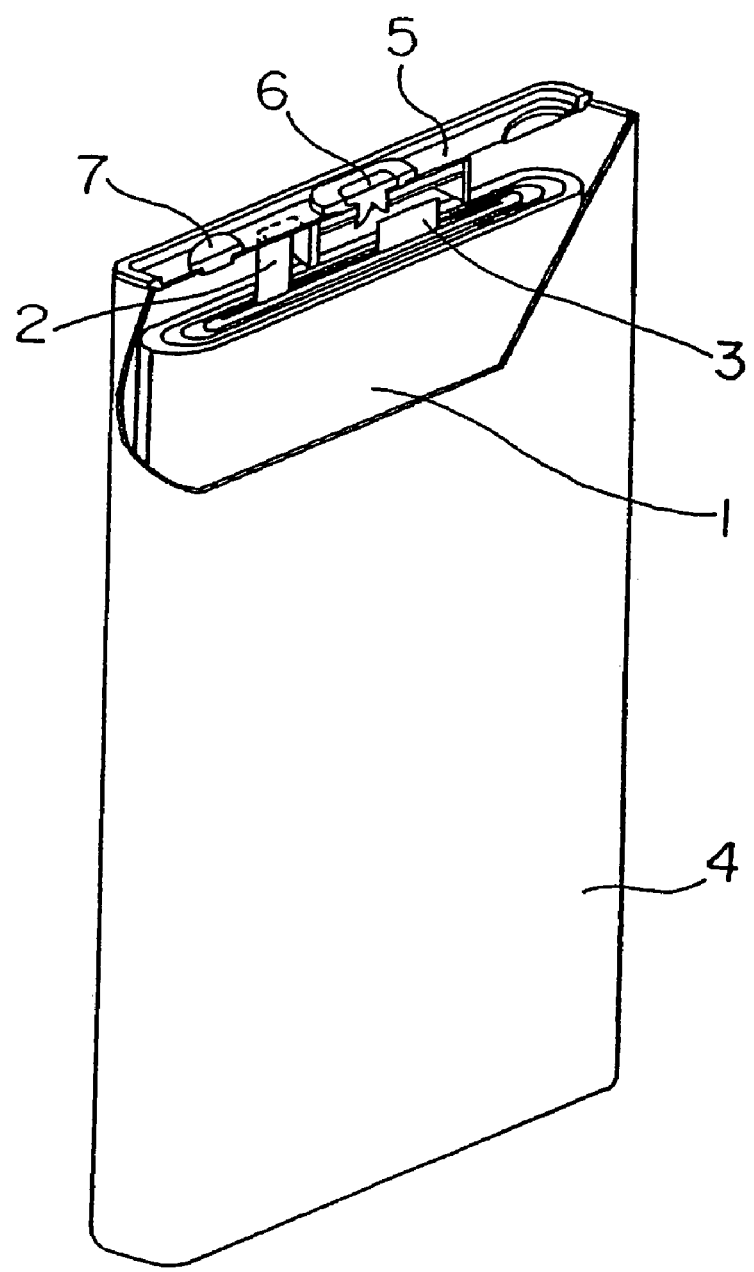
FIG. 1 is an oblique view, with a part broken away, illustrating a lithium rechargeable battery manufactured in an example of the present invention.

The present invention relates to a lithium rechargeable battery. In particular, it relates to a lithium rechargeable battery comprising a negative electrode including a carbon material as an active material, a positive electrode including a lithium-containing transition metal complex oxide as an active material, a separator and a non-aqueous electrolyte.

More specifically, the present invention relates to a lithium rechargeable battery using a negative electrode formed by fixing, on a copper core material, an active material comprising a mixture of artificial graphite particles A and spherical graphite particles B having a high mean particle circularity. The artificial graphite particles A are obtained by kneading and granulating a base material of pulverized bulk mesophase pitch with pitch in a softened state and/or thermosetting resin, carbonizing the resulting granules at 700 to 1,500° C. and graphitizing the carbonized granules at 2,500 to 3,000° C.

In the above-described method of manufacturing the artificial graphite particles A, the base material prepared by pulverizing the bulk mesophase pitch preferably has an average particle diameter of 7 to 20 μm. The pitch and/or thermosetting resin is preferably used in an amount of 8 to 25 parts by weight with respect the base material of 100 parts by weight.

The artificial graphite particles A as the main negative electrode active material have a sufficiently developed graphite structure, graphite crystal oriented in a random direction and a small BET specific surface area. Further, the extent to which the particles crush or collapse through the charge/discharge cycles is small. Owing to these features according to the present invention, a lithium rechargeable battery can be designed to have high energy density far in excess of 350 Wh/L. In parallel, decrease in battery capacity due to the decomposition of the electrolyte on the negative electrode through the charge/discharge cycles is extremely small, which allows the lithium rechargeable battery to have great stability (heat resistance and the like).

In a preferred embodiment of a lithium rechargeable battery of the present invention, a negative electrode and a positive electrode with a separator interposed therebetween are wound in the form of an almost rectangular column or an elliptic cylinder to form an electrode group and the electrode group is accommodated and sealed in a prismatic metal case or an aluminum foil/resin film laminate case, in which a non-aqueous electrolyte is injected. Also in the lithium rechargeable battery thus configured, the high energy density is maintained and the battery capacity is prevented from decreasing through the charge/discharge cycles owing to the above-described features of the artificial graphite particles A. In particular, are sufficiently prevented the deformation (swelling) of the battery case in the thickness direction caused by cracked gas generated from the negative electrode, as well as the deformation of the wound electrode group due to expansion and contraction of the negative electrode material mixture layer, which are phenomena unique to the battery having such structure. In parallel, the stability of the battery (heat resistance) is also maintained at high level.

In a lithium rechargeable battery of the present invention, a rubber-like binder containing a butadiene unit is preferably used as a binder for the negative electrode material mixture and a cellulose-based thickener such as CMC is preferably used for kneading the mixture. In other words, it is preferred that the active material comprising a mixture of the artificial graphite particles A and the spherical graphite particles B having a high mean particle circularity is fixed onto the copper core material using the rubber-like binder containing a butadiene unit and the cellulose-based thickener.

The cellulose-based thickener may be a polymer of cellulose or various derivatives thereof. Among them, carboxymethyl cellulose is preferable because it is capable of giving high viscoelasticity in a small amount.

In general, there are two ways for manufacturing a negative electrode of a lithium rechargeable battery. One of them is to prepare an aqueous paste by adding a binder such as SBR (styrene-butadiene copolymer rubber), a thickener such as CMC (carboxymethyl cellulose) and water in an appropriate amount to graphite particles as an active material and apply the resulting paste to a core material. The other is to prepare an organic paste by adding a binder/thickener such as PVDF (polyvinylidene fluoride) and a dispersion medium such as NMP (N-methyl-2-pyrrolidone)

to graphite particles as an active material and apply the resulting paste to a core material.

Various analyses show that the former aqueous paste is superior to the other in that the resulting negative electrode prevents reductive decomposition of an electrolyte on the graphite particles, though it is poor in rheologic stability in the steps of kneading and coating. For example, such an aqueous paste is very effective in reducing the initial irreversible capacity of the negative electrode, preventing reductive decomposition of the electrolyte (generation of gas) on the negative electrode of a charged battery during storage at high temperature, as well as inhibiting the generation of gas accompanying the charge/discharge cycles of the battery. Partially relevant description is found in recent technical documents, for example, Japanese Laid-Open Patent Publication No. 2001-076731. Thus, it is preferred to use an aqueous paste as mentioned above for preparing a negative electrode if importance is placed on practical characteristics of the battery rather than productivity.

Hereinafter, the artificial graphite particles A and the spherical graphite particles B adopted in the present invention are explained in terms of their physical properties.

The artificial graphite particles A are prepared by kneading and granulating a base material of pulverized bulk mesophase pitch with pitch in a softened state and/or thermosetting resin, carbonizing the resulting granules at 700 to 1,500° C. and graphitizing the carbonized granules at 2,500 to 3,000° C. The particles are isotropic artificial graphite particles in which graphite structure is oriented at random and have the following physical properties: (1) an interplanar spacing $d_{002}$ between the (002) planes obtained by a powder X-ray diffraction method being not more than 3.362 Å; (2) a ratio $I_{002}/I_{110}$ of the peak intensity $I_{002}$ attributed to the (002) plane to the peak intensity $I_{110}$ attributed to the (110) plane, which are found from a diffraction pattern obtained by X-ray diffraction of the artificial graphite particles A molded into a pellet of 1.6 g/cm$^3$ in density, being not more than 1,000; (3) a mean circularity of the particles being 0.85 to 0.95; (4) a particle diameter $D_{50}$ corresponding to a volume fraction of 50% measured by a laser diffraction particle size distribution analyzer being 15 to 30 μm, and a ratio $D_{10}/D_{90}$ of a particle diameter $D_{10}$ corresponding to a volume fraction of 10% to a particle diameter $D_{90}$ corresponding to a volume fraction of 90% being 0.2 to 0.5; (5) a tap density being not less than 1 g/cm$^3$; and (6) a specific surface area measured by a BET method being not more than 1 m$^2$/g.

The particle diameter $D_x$ corresponding to the volume fraction of x % is obtained from a particle size distribution on the volume basis shown in an a-b coordinate system wherein the abscissa a represents the particle diameter and the ordinate b represents the number of the particles. In the ascending order of value a, the volume of the particles is added up to obtain value a at which the sum of the volumes reaches x % of the total. This value is regarded as the particle diameter $D_x$ corresponding to the volume fraction of x %.

Since the granules are sufficiently graphitized until the interplanar spacing $d_{002}$ between the (002) planes reaches not more than 3.362 Å, high capacity graphite particles are obtained with the reversible capacity in excess of 340 mAh/g.

If the particle size of the base material (pulverized bulk mesophase pitch), the mixing ratio of the binder (pitch and/or thermosetting resin) and the conditions for kneading and granulating the base material with the binder are adjusted such that the particles have the mean circularity of 0.85 to 0.95, the particle diameter $D_{50}$ of 15 to 30 μm and the ratio $D_{10}/D_{90}$ of 0.2 to 0.5, the negative electrode material mixture can be obtained with fine handling quality for kneading and coating, as well as excellent permeability to the electrolyte even if it is formed into a high density negative electrode.

The mean circularity of the particles is expressed by the ratio l/L, where l is the circumference of a circle having the same area as that of an image of a particle projected on a plane and L is the circumference of the particle image.

From a viewpoint of forming a high density negative electrode by coating a negative electrode material mixture layer in high density on a copper core material and rolling the layer under low pressure without causing damage on the particles, it is preferred that the tap density of the artificial graphite particles A is higher. Specifically, the artificial graphite particles A having the tap density of not less than 1 g/cm$^3$ are used.

The tap density mentioned herein is a value obtained by tapping 900 times. The tap density varies depending on the measurement conditions such as the number of tappings. For example, tapping of about 100 times is insufficient but that of 300 to 500 times will give a constant tap density. Accordingly, the tapping of 900 times is enough to obtain a certain tap density.

In light of a correlation among the specific surface area of the negative electrode graphite particles, the initial irreversible capacity and the thermal stability (heat resistance under the charged state) of the negative electrode, the present invention utilizes the artificial graphite particles A having a specific surface area controlled to an extremely low value of not more than 1 m$^2$/g measured by a BET method.

In this context, worthy of special note is that, as the artificial graphite particles having fully developed graphite structure, graphite crystal oriented in a random direction, an average particle diameter and a particle size distribution controlled within the above-described ranges and a BET specific surface area controlled as low as 1 m$^2$/g or less, no other particles are found through the inventors' research than those of the present invention prepared by kneading and granulating the base material of pulverized bulk mesophase pitch with pitch in a softened state and/or thermosetting resin, carbonizing the resulting granules at 700 to 1,500° C. and graphitizing the carbonized granules at 2,500 to 3,000° C.

By using such graphite particles as the main active material, is obtained an almost ideal negative electrode showing large reversible capacity, small initial irreversible capacity, an excellent charge/discharge rate characteristic with less expansion and contraction through the charge/discharge cycles, a great cycle life characteristic, as well as a superior level of safety.

The spherical graphite particles B have the following physical properties: (1) a mean circularity of the particles being 0.88 to 1; (2) a particle diameter $D_{50}$ corresponding to a volume fraction of 50% measured by a laser diffraction particle size distribution analyzer being 5 to 15 μm; (3) an interplanar spacing $d_{002}$ between the (002) planes obtained by a powder X-ray diffraction method being not more than 3.357 Å; and (4) a specific surface area measured by a BET method being not more than 8 m$^2$/g.

Such spherical graphite particles can be produced, for example, by classifying a certain kind of massive natural graphite particles or artificial graphite particles, or removing coarse grains therefrom. If the spherical graphite particles having the graphite structure sufficiently developed to have the interplanar spacing $d_{002}$ between the (002) planes of not more than 3.357 Å are selected, large reversible capacity graphite is expected. In parallel, electrostatic repulsion between particles (interaction between π electrons), which is a phenomenon unique to graphite, is also caused. Therefore, if the negative electrode active material is prepared by adding the spherical graphite particles B to the artificial graphite particles A, the resulting negative electrode material mixture layer can easily be rolled in high density.

A noticeable feature of the present invention is that the spherical graphite particles B are not flake-like particles but those having an extremely high mean circularity of 0.88 to 1 and the particle diameter $D_{50}$ of 5 to 15 μm. With the use of the particles having a high mean particle circularity, is avoided the problem of the orientation of the spherical graphite particles B in the vicinity of the mixture layer surface, which leads to difficulty in impregnating an electrolyte into the inside of the negative electrode material mixture.

In addition, it is preferred to mix the spherical graphite particles B having the average particle diameter in the above-described range with the artificial graphite particles A in a mixing ratio of 5 to 45 wt % with respect to the whole active material. Thereby, the spherical graphite particles B are arranged densely so as to fill space among the graphite particles A as the main active material. This is the most suitable structure for obtaining a negative electrode material mixture layer rolled in high density.

It is more preferable that the spherical graphite particles B have a smaller BET specific surface area. However, if the spherical graphite particles B are made finer such that the average particle diameter thereof is within the above-described range, the BET specific surface area inevitably increases to some extent. From this point, the present invention sets an upper limit of 8 $m^2$/g to the BET specific surface area of the spherical graphite particles B.

The spherical graphite particles B are preferably natural graphite particles and/or natural graphite particles subjected to surface reforming treatment. The use of the spherical graphite particles B derived from natural graphite is preferable because the maximum reversible capacity is expected from the spherical graphite particles B. Although depending on the place of origin and the impurity concentration, natural graphite is generally less expensive than artificial graphite that requires the graphitization process. Therefore, the spherical graphite particles B derived from natural graphite are cost-effective in many cases. Further, in light of the safety (heat resistance) of the graphite negative electrode, it is preferable to reduce the BET specific surface area of the spherical graphite particles B as much as possible. For this reason, it is most suitable to use natural graphite particles subjected to a reforming treatment for smoothing (coating) the particle surfaces. For example, the smoothing of the particle surfaces is performed by a method of carbonizing and graphitizing the particles with an organic material such as tar or pitch coated thereon, or a method of applying high mechanical impact or shearing force to the graphite particles to cause mechano-chemical reaction, thereby making the particle surfaces amorphous and smooth.

In the negative electrode material mixture (or an aqueous paste), an optimum addition amount of the rubber-like binder containing a butadiene unit is not more than 3% by weight with respect to the weight of the active material. The rubber-like binder containing the butadiene unit is often added to the paste in the form of an aqueous dispersion of fine rubber particles and the addition amount thereof is generally determined in consideration of the binding force between the negative electrode material mixture layer and the copper core material. However, since the rubber particles are basically insulative, the particles, if added in an excessive amount, cover the surface of the graphite particles of the negative electrode active material, deteriorating the charge/discharge characteristics of the negative electrode. Considering the average particle diameter, the particle size distribution and the BET specific surface area of the graphite particles used as the negative electrode active material, the addition amount of the rubber-like binder needs to be controlled to 3% by weight or less in the present invention.

According to the most suitable embodiment, the negative electrode material mixture layer formed on the copper core material has a density of 1.6 to 1.8 $g/cm^3$ and a thickness of 40 to 100 μm. The density of the negative electrode material mixture layer set as high as 1.6 to 1.8 $g/cm^3$ allows designing of the lithium rechargeable battery having high energy density far in excess of 350 Wh/L. If the thickness of the mixture layer exceeds 100 μm, the diffusion of Li ions in the active material particles in the mixture layer becomes difficult, thereby deteriorating the charge/discharge rate characteristic. On the other hand, if the thickness of the mixture layer is made smaller than 40 μm, the graphite particles needs to be reduced in size such that the value $D_{90}$ reaches about 30 μm. However, adjustment of the particle size to such a degree is substantially difficult in relation to the artificial graphite particles A formed through the granulating process to be used as the main active material in the present invention. For these reasons, in the present invention, the thickness of the negative electrode material mixture layer formed on the copper core material is controlled within the range of 40 to 100 μm.

EXAMPLE

First, explanation is given of the method of determining the physical properties of the graphite particles (powder) used as the active material in this example.

(1) Determination of Interplanar Spacing $d_{002}$ Between (002) Planes

Using a powder X-ray diffraction apparatus RINT2500/PC manufactured by Rigaku Corporation, a monochrome X-ray was applied to carbon powder added with an internal standard of high purity silicon to determine the peak attributed to the (002) plane of graphite. The obtained peak was corrected with reference to the peak of silicon as the internal standard to obtain $d_{002}$, an interplanar spacing of a graphite layer. Specific evaluation was pursuant to the one defined by the 117th Committee of Japan Society for the Promotion of Science.

(2) Determination of Peak Intensity Ratio $I_{002}/I_{110}$

Graphite powder was placed in a certain holder and molded into a pellet having a density of 1.6 $g/cm^3$ using a platen press. A diffraction pattern thereof was obtained using the same X-ray diffraction apparatus as that used in the above (1). Then, the ratio $I_{002}/I_{110}$ of the peak intensity $I_{002}$ attributed to the (002) plane to the peak intensity $I_{110}$ attributed to the (110) plane was determined. The peak intensity mentioned herein was the peak height.

(3) Determination of Mean Circularity of Particles

Using a scanning electron microscope S-2500 manufactured by Hitachi, Ltd., an image of a graphite particle (powder) magnified 1,000 times was obtained. Then, the ratio l/L of the circumference l of a circle having the same area as the projected image of the particle to be observed to the circumference L of the projected image of the particle was obtained with respect to 500 particles. A mean value thereof was obtained as a mean circularity of the particles. It was confirmed by another experiment that almost the same value was obtained by measurement of the mean circularity of the particles using FPIA-1000, a flow particle image analyzer of Sysmex Corporation available from HOSOKAWA MICRON.

(4) Determination of Particle Diameters ($D_{50}$), ($D_{10}$) and ($D_{90}$) Each Corresponding to Volume Fractions of 50%, 10% and 90%

About 1 cc of an aqueous solution of 2 vol % poly (oxyethylene) sorbitan monolaurate was prepared as a surfactant and mixed with graphite particles (powder) in advance. Then, ion exchange water was added as a dispersion medium. Using a laser diffraction particle size distribution analyzer LA-700 manufactured by Horiba, Ltd., were obtained a particle diameter $D_{50}$ corresponding to a volume fraction of 50% (median, an average particle diameter), a particle diameter $D_{10}$ corresponding to a volume fraction of 10% and a particle diameter $D_{90}$ corresponding to a volume fraction of 90%.

(5) Determination of Tap Density

A method for determining a tap density of a graphite powder material is defined by JIS-K5101. The determination of the tap density in this example was carried out referring to this standard. Specifically, tapping was carried out 900 times under the following conditions because the graphite powder material is extremely light in weight and a stable value cannot be obtained without increasing the number of tapping times.

For the determination, Powder Tester PT-R manufactured by HOSOKAWA MICRON was used together with a sieve of 200 μm mesh for passing the sample through. Graphite powder was dropped into a 20 cc tapping cell until the cell was filled and tapping was carried out 900 times at a rate of one time per second with a stroke length of 18 mm to determine the tap density.

(6) Determination of BET Specific Surface Area

Using AMS-8000 manufactured by Ohkurariken Co., Ltd., graphite powder was preliminarily dried by heating at 350° C. and placed under a nitrogen gas flow for 15 minutes. Then, a specific surface area thereof was determined by a BET single point method under relative pressure of 0.3 through the nitrogen gas adsorption.

(Preparation of Negative Electrode Graphite Particles)

In this example, various negative electrode graphite particles obtained in the following manner were analyzed.

1. Artificial Graphite Particles A1

Coal tar was placed in a reduced pressure distillation apparatus and stirred while heating at 350° C. under reduced pressure in the presence of nitric acid to polymerize the coal tar, which was then heated at 500° C. to be shifted to a mesophase. Thus, bulk mesophase pitch with a small volatile amount was obtained.

The resulting bulk mesophase pitch was taken out after being cooled and pulverized with a rotation impact mill (a fine mill) to have an average particle diameter of 13 μm. Thus, a base material was obtained.

Then, 15 parts by weight of coal tar pitch (softening point: 80° C.) was mixed as a binder into 85 parts by weight of the base material, which was kneaded at 200° C. for 120 minutes in a Z-shaped kneader. In this process, the mixture gradually increased the viscosity to be granular.

The resulting granules were taken out after being cooled, which were pulverized and placed in a graphite crucible. This was placed in a continuous calcining furnace for carbonization (calcination) in a nitrogen atmosphere at 800° C.

The resulting substance was placed in an Acheson graphitizing furnace for graphitization in a nitrogen atmosphere at 2,950° C., which was then pulverized and classified to obtain artificial graphite particles A1 having $D_{50}$, a particle diameter corresponding to a volume fraction of 50%, of 23 μm.

2. Artificial Graphite Particles A2

Artificial graphite particles A2 having $D_{50}$ of 23 μm were obtained in the same manner as the above item 1 (preparation of the artificial graphite particles A1) except that coal tar pitch used as the binder was replaced with phenol resin.

3. Spherical Graphite Particles B1

Flake-like natural graphite of China origin was pulverized with a counter jet mill to obtain flake-like natural graphite particles having $D_{50}$ of 20 μm. The resulting graphite particles were introduced in another counter jet mill, in which the operation conditions were adjusted to make the particles collide with each other in high-speed airflow, thereby controlling the shape of the graphite particles (making the particles spherical). Then, the particles were washed with an aqueous solution of hydrofluoric acid to remove impurities (ash content) and then dried. Then, intense air classification was performed to remove coarse grains. Thus, spherical graphite particles B1 having $D_{50}$ of about 10 μm were obtained.

4. Spherical Graphite Particles B2

Needle-like coke powder (anisotropic coke) adjusted to have an average particle diameter of 20 μm was placed in a graphite crucible and graphitized at 2,950° C. in an Acheson graphitizing furnace. Then, the particles were introduced in a counter jet mill same as that used in the above item 3 (preparation of the spherical graphite particles B1) and collided with each other in high-speed airflow under the adjusted operation conditions to control the shape of the particles (to make the particles spherical). The resulting particles were subjected to intense air classification to remove coarse grains. Thus, spherical graphite particles B2 having $D_{50}$ of about 10 μm were obtained.

5. Comparative Artificial Graphite Particles C1 (with Crystal Oriented at Random)

In a mixer, 50 parts by weight of needle-like coke (anisotropic coke) as a base material adjusted to have an average particle diameter of 8 μm, 20 parts by weight of tar pitch as a binder and 15 parts by weight of coal tar were kneaded under heating to form granules.

The resulting granules were taken out after being cooled and pulverized, which were formed into a block by isotropic pressure molding, followed by carbonization (calcination) at 800° C. This was graphitized in a graphitizing furnace at 2,950° C., pulverized with a mill and classified to obtain comparative artificial graphite particles C1 having $D_{50}$ of 21 μm.

6. Comparative Artificial Graphite Particles C2 (with Crystal Oriented at Random, Graphitized to a Higher Degree)

In a mixer, 50 parts by weight of needle-like coke (anisotropic coke) as a base material adjusted to have an average particle diameter of 8 μm, 20 parts by weight of tar pitch as a binder, 15 parts by weight of coal tar and 5 parts by weight of boron carbide ($B_4C$) as a catalyst for promoting the graphitization were kneaded under heating to form granules.

The resulting granules were taken out after being cooled and pulverized, which were formed into a block by isotropic pressure molding, followed by carbonization (calcination) at 800° C. This was graphitized in a graphitizing furnace at 2,800° C. under an argon atmosphere, pulverized with a pin mill and classified to obtain comparative artificial graphite particles C2 having $D_{50}$ of 21 µm.

7. Comparative Artificial Graphite Particles D (Graphitized Milled-MCF)

Bulk mesophase pitch (derived from petroleum pitch) in a fused state at an atmospheric temperature of 360° C. was spun by melt blowing and made infusible by surface oxidation. Then, carbonization (calcination) was performed at 800° C. to obtain a carbide mat. This mat was cut and pulverized with a high speed rotation mill, put through an oscillation sieve to remove coarse grains, thereby obtaining milled carbon fiber having an average particle diameter of 18 µm (milled mesocarbon pitch-based fiber; abbreviated as milled-MCF). To the milled carbon fiber, 5 parts by weight of boron carbide ($B_4C$) was added as a catalyst for promoting the graphitization, which was then graphitized in a graphitizing furnace under an argon atmosphere at 2,800° C. Thus, comparative artificial graphite particles D were obtained.

8. Comparative Artificial Graphite Particles E (Graphitized MCMB)

Coal tar was heated at 350° C. to generate mesophase microspheres, to which a solvent was added. Then, the microspheres were extracted using a filter press, which were carbonized (calcined) at 800° C. and classified through an oscillation sieve to obtain mesocarbon microbeads (MCMB) having an average particle diameter of 26 µm. These were graphitized in an Acheson graphitizing furnace at 2,950° C., followed by pulverization and classification, to obtain comparative artificial graphite particles E.

9. Comparative Artificial Graphite Particles F (Graphitized Bulk Mesophase Pitch)

Bulk mesophase pitch prepared in the same manner as the first half of the above item 1 (preparation of the artificial graphite particles A1) was pulverized with a mill such that the particle diameter $D_{50}$ was adjusted to 20 µm, and then carbonized (calcined) at 800° C. The resulting substance was placed in a graphite crucible and graphitized in an Acheson graphitizing furnace at 2,950° C., followed by pulverization and classification. Thus, comparative artificial graphite particles F were obtained.

10. Massive Natural Graphite Particles G

Flake-like natural graphite of Sri Lanka origin was molded under consolidation pressure, which was pulverized with a mill to obtain flake-like natural graphite particles having $D_{50}$ of 21 µm. These were washed with hydrofluoric acid to remove impurities (ash content) and then dried. The resulting flake-like natural graphite particles were made into spherical shape by a hybridization system (a means of adjusting the particle shape in a chamber by giving the particles impact and shear force by high-speed rotation) and subjected to air classification. Thus, massive natural graphite particles G were obtained.

11. Surface-coated Natural Graphite Particles H

In a heated mixer, 100 parts by weight of the massive natural graphite particles G prepared in the above item 10 and 5 parts by weight of petroleum-based pitch were kneaded. The resulting mixture was subjected to heat treatment (annealing) in a calcining furnace at 1,300° C. to carbonize the pitch adhered to the surface of the particles, followed by pulverization and classification. Thus, surface-coated natural graphite particles H were obtained.

Table 1 shows the powder properties of these 11 kinds of graphite particles.

TABLE 1

| No. | Kind of graphite particles | $d_{002}$ [Å] | $I_{002}/I_{110}$ | Circularity of particles | $D_{50}$ [µm] | $D_{10}/D_{90}$ | Tap Density [g/cm³] | BET Specific surface area [m²/g] |
|---|---|---|---|---|---|---|---|---|
| 1 | Artificial graphite particles A1 | 3.360 | 390 | 0.88 | 23.3 | 0.33 | 1.06 | 0.4 |
| 2 | Artificial graphite particles A2 | 3.360 | 410 | 0.89 | 23.1 | 0.32 | 1.08 | 0.5 |
| 3 | Spherical graphite particles B1 | 3.354 | 1530 | 0.89 | 10.2 | 0.29 | 0.79 | 7.2 |
| 4 | Spherical graphite particles B2 | 3.356 | 1760 | 0.88 | 10.6 | 0.33 | 0.82 | 6.9 |
| 5 | Comparative artificial graphite particles C1 | 3.363 | 610 | 0.86 | 21.3 | 0.17 | 0.83 | 3.8 |
| 6 | Comparative artificial graphite particles C2 | 3.362 | 580 | 0.87 | 20.9 | 0.16 | 0.84 | 3.5 |
| 7 | Comparative artificial graphite particles D (graphitized milled-MCF) | 3.357 | 980 | 0.65 | 18.5 | 0.23 | 1.09 | 1.3 |
| 8 | Comparative artificial graphite particles E (graphitized MCMB) | 3.359 | 540 | 0.96 | 27.2 | 0.41 | 1.40 | 0.7 |
| 9 | Comparative artificial graphite particles F (graphitized bulk mesophase pitch) | 3.363 | 720 | 0.86 | 16.5 | 0.24 | 1.39 | 0.6 |
| 10 | Massive natural graphite particles G (comparative) | 3.354 | 1480 | 0.91 | 17.9 | 0.33 | 0.97 | 6.3 |
| 11 | Surface-coated natural graphite particles H (comparative) | 3.360 | 1350 | 0.92 | 19.5 | 0.43 | 1.08 | 2.6 |

In the manufacture of a negative electrode for a lithium rechargeable battery, one of these graphite particles may solely be used as the negative electrode active material, or alternatively, two or more of them may be mixed in a predetermined ratio.

In light of the inventors' empirical rule concerning various graphite particles, if the special artificial graphite particles D, E or F derived from mesophase carbon are used solely as the negative electrode active material with the intention of forming the negative electrode having a relatively high density of 1.6 g/cm³ as compared with conventional batteries by rolling the graphite material mixture layer on the copper core material using a roller, it is difficult in many instances to roll the mixture layer in the intended density (too hard to be rolled). Since the mesophase particles have been subjected to treatment for making their surface layers infusible (mild oxidation treatment) before the carbonization and graphitization steps, the surface layers of the particles are almost in an amorphous state where the graphitization is not proceeded to a satisfactory degree. In amorphous carbon having no layer structure, electrostatic repulsion between particles (interaction between π electrons), which is a phenomenon unique to the graphite layer structure, is small, and hence slippage between the particles is lacking. This is considered as the reason for the difficulty in rolling the mixture layer in high density. Though the details are set aside, the graphite particles A1 and A2 of the present invention coated on the copper core material were also subjected to a compression test as a preliminary examination. The results indicated that both particles were relatively hard, but not to the extent of the particles D, E and F.

From the above, in this analysis, it was considered as essential to use the graphite particles A1, A2, D, E or F as the negative electrode active material together with the spherical graphite particles B1 or B2 having a high mean circularity. Thus, examinations were performed on 22 kinds of negative electrode active materials a to v prepared in the mixing ratio (by weight) shown in Table 2.

Even if the high density negative electrode is obtained by the solo use of the graphite particles A1 or A2, it is supposed that the particles are apt to fall off the electrode plate with relative ease as the charge/discharge cycles are repeated. The reason for such tendency is presumed that the particles are relatively hard and cannot distribute the stress caused by expansion and contraction of the negative electrode material mixture layer during the charge and discharge.

On the other hand, if the spherical graphite particles B1 or B2 are used solely, the capacity may be decreased as the charge/discharge cycles are repeated or the safety of the battery may be deteriorated because of the large specific surface area.

TABLE 2

| Negative electrode active material | Mixing ratio of graphite particles |
|---|---|
| a | Artificial graphite particles A1:spherical graphite particles B1 = 75:25 |
| b | Artificial graphite particles A1:spherical graphite particles B2 = 75:25 |
| c | Artificial graphite particles A2:spherical graphite particles B1 = 75:25 |
| d | Artificial graphite particles A2:spherical graphite particles B2 = 75:25 |
| e | Comparative artificial graphite particles C1 = 100 |
| f | Comparative artificial graphite particles C1:spherical graphite particles B1 = 75:25 |
| g | Comparative artificial graphite particles C1:spherical graphite particles B2 = 75:25 |
| h | Comparative artificial graphite particles C2 = 100 |
| i | Comparative artificial graphite particles C2:spherical graphite particles B1 = 75:25 |
| j | Comparative artificial graphite particles C2:spherical graphite particles B2 = 75:25 |
| k | Comparative artificial graphite particles D:spherical graphite particles B1 = 75:25 |
| l | Comparative artificial graphite particles D:spherical graphite particles B2 = 75:25 |
| m | Comparative artificial graphite particles E:spherical graphite particles B1 = 75:25 |
| n | Comparative artificial graphite particles E:spherical graphite particles B2 = 75:25 |
| o | Comparative artificial graphite particles F:spherical graphite particles B1 = 75:25 |
| p | Comparative artificial graphite particles F:spherical graphite particles B2 = 75:25 |
| q | Massive natural graphite particles G = 100 |
| r | Massive natural graphite particles G:spherical graphite particles B1 = 75:25 |
| s | Massive natural graphite particles G:spherical graphite particles B2 = 75:25 |
| t | Surface-coated natural graphite particles H = 100 |
| u | Surface-coated natural graphite particles H:spherical graphite particles B1 = 75:25 |
| v | Surface-coated natural graphite particles H:spherical graphite particles B2 = 75:25 |

(Manufacture of Negative Electrode)

To 100 parts by weight of a negative electrode active material "a", were added 100 parts by weight of an aqueous solution of 1 wt % carboxymethyl cellulose (CMC) and an aqueous dispersion of styrene butadiene rubber (SBR) as a binder, which were sufficiently kneaded to give a mixture slurry. The addition amount of SBR was adjusted such that the solid content (rubber content) took 2 parts by weight with respect to 100 parts by weight of the negative electrode active material "a".

The thus obtained slurry was coated in a certain thickness on both surfaces of a copper foil (10 μm in thickness) using a coating device and dried by hot air of 100° C. Then, the coated mixture layers were rolled with rollers to have a density of 1.7 g/cm$^3$ (including the weights of CMC and SBR) and a thickness of 70 μm (about 150 μm as an electrode). This was cut into a predetermined size, to which a nickel lead for collecting electric current was mounted to form a negative electrode "a". In the same manner, negative electrodes "b" to "v" were made using the negative electrode active materials "b" to "v", respectively.

(Manufacture of Positive Electrode)

In this analysis, LiCoO$_2$ was prepared as a positive electrode active material by calcining a mixture of Co$_3$O$_4$ and Li$_2$CO$_3$ at 950° C. in an atmospheric air and pulverizing the calcined mixture for adjusting the particle size. For the manufacture of a positive electrode plate, 3 parts by weight of acetylene black (AB) was sufficiently dispersed as a conductive material in 100 parts by weight of the positive electrode active material in a dry mixer, to which 5 parts by weight of polyvinylidene fluoride (PVDF) was added as a binder. This was kneaded while adding N-methyl-2-pyrrolidone (NMP) in an appropriate amount to form a mixture slurry. The resulting slurry was coated in a certain thickness on both surfaces of an aluminum foil (20 μm in thickness) using a coating device and dried under dry air of 100° C. Then, the coated layers were rolled with rollers to have a density of 3.7 g/cm$^3$ (including the weights of AB and PVDF) and a thickness of 70 μm (about 160 μm as an electrode). This was cut into a predetermined size, to which an aluminum lead for collecting electric current was mounted to complete a positive electrode.

(Manufacture of Lithium Rechargeable Battery)

For the purpose of removing an excess of moisture, the negative electrode "a" and the LiCoO$_2$ positive electrode formed as described above were subjected to vacuum drying at 100° C for 8 hours. A porous polyethylene film separator (25 μm in thickness) for physically isolating the electrodes was also dried under vacuum at 50° C. for 12 hours.

Subsequently, the negative electrode "a" and the positive electrode with the separator interposed therebetween were wound to form an electrode group 1 in the form of an almost rectangular column (having an almost rectangular vertical section) as shown in FIG. 1. The electrode group 1 in the almost rectangular column shape was inserted in a 533048-size (5.3 mm in thickness×30 mm in width×48 mm in height) prismatic battery case 4 made of an aluminum alloy. A positive electrode lead 2 was welded to a sealing plate 5 on the top of the case and a negative electrode lead 3 was welded to a negative electrode terminal 6 which was electrically isolated from the sealing plate by an insulating gasket. Then, the sealing plate 5 was welded to the battery case 4 using a laser and a non-aqueous electrolyte was injected in the case through an injection hole provided in the sealing plate to impregnate the electrode group with the electrolyte under vacuum.

With the injection hole remained open, initial partial charge was carried out to get rid of gas generated by electrolyte decomposition accompanying the generation of a membrane on the negative electrode. Then, a stopper 7 of an aluminum alloy was put on the injection hole, fused by a laser and solidified to seal the injection hole. Thus, a lithium rechargeable battery a reflecting the properties of the negative electrode a was obtained (designed capacity was 800 mAh). Further, lithium rechargeable batteries "b" to "v" were formed in the same manner as described above except that the negative electrodes "b" to "v" were used, respectively, in place of the negative electrode "a". Every manufacturing step, including the steps of forming the electrode group, welding the leads to the positive and negative electrodes, welding the sealing plate to the case, injecting the electrolyte for the impregnation, the initial partial charge and sealing with the stopper, was carried out in a dry air atmosphere where a dew point was not more than −40° C.

As the non-aqueous electrolyte, was used a solution prepared by dissolving $LiPF_6$ in a concentration of 1.0 M (M: mol/L) in a solvent of ethylene carbonate (EC), ethyl methyl carbonate (EMC) and diethyl carbonate (DEC) mixed in the volume ratio of 1:2:1. After the electrolyte was injected in the case, the initial partial charge of the battery was performed at the charge rate of 0.1 C (80 mA on the assumption of 1 C=800 mA) at an atmospheric temperature of 20° C. for 2 hours.

(Evaluations of Battery Characteristics)

The lithium rechargeable batteries manufactured as described above were evaluated on the following points.

I. Determination of Irreversible Capacity

The lithium rechargeable batteries of 22 kinds manufactured as described above were subjected to three charge/discharge cycles under the following conditions.

Charge: constant current system, a current of 0.2 C (160 mA), a final voltage of 4.1 V Discharge: a constant current of 0.2 C (160 mA), a discharge cut voltage of 3.0 V Atmospheric temperature: 20° C.

Initial irreversible capacity of each battery was calculated by the following formula:

Initial irreversible capacity={(initial partial charge capacity in the manufacture of the battery: 160 mAh)+(total charge capacity in the three cycles)−(total discharge capacity in the three cycles)}/3.

II. High Rate Discharge Characteristic

After the determination of the irreversible capacity, the 22 lithium rechargeable batteries were subjected to the following charge/discharge test to obtain the ratio of discharge capacity (the ratio $C_2/C_{0.2}$ of discharge capacity $C_2$ at 2 C and discharge capacity $C_{0.2}$ at 0.2 C), thereby evaluating the high rate discharge characteristic of each battery. Atmospheric temperature during the test was 20° C.

First Cycle

Charge: constant current/constant voltage system, a current of 0.7 C (560 mA), a charge control voltage of 4.2 V, total charge time of 2.5 hours Discharge: a constant current of 0.2 C, (160 mA), a discharge cut voltage of 3.0 V Second Cycle Charge: constant current/constant voltage system, a current of 0.7 C (560 mA), a charge control voltage of 4.2 V, total charge time of 2.5 hours Discharge: a constant current of 2 C (1600 mA), a discharge cut voltage of 3.0 V III. Discharge Characteristic at Low Temperature After the determination of the irreversible capacity, the 22 lithium rechargeable batteries were subjected to another charge/discharge test as described below to obtain the ratio of discharge capacity (the ratio $C_{-10}/C_{20}$ of discharge capacity $C_{-10}$ at 1 C and −10° C. and discharge capacity $C_{20}$ at 1 C and 20° C.), thereby evaluating the discharge characteristic of each battery at low temperature.

First Cycle

Charge: constant current/constant voltage system, a current of 0.7 C (560 mA), a charge control voltage of 4.2 V, total charge time of 2.5 hours, atmospheric temperature of 20° C.

Discharge: a constant current of 1 C, (800 mA), a discharge cut voltage of 2.5 V (discharge capacity was cumulated up to 3.0 V), atmospheric temperature of 20° C.

Second Cycle

Charge: constant current/constant voltage system, a current of 0.7 C (560 mA), a charge control voltage of 4.2 V, total charge time of 2.5 hours, atmospheric temperature of 20° C.

Discharge: a constant current of 1 C (800 mA), a discharge cut voltage of 2.5 V (discharge capacity was cumulated up to 3.0 V), atmospheric temperature of −10° C.

IV. Cycle Life Characteristic

After the determination of the irreversible capacity, the 22 lithium rechargeable batteries were subjected to 500 charge/discharge cycles under the following conditions. Then, capacity $C_{500}$ at the 500th cycle and capacity $C_{ini}$ at the initial cycle were compared to determine the degree of capacity maintenance ($C_{500}/C_{ini}$). The swelling (expansion) of the battery in the thickness direction through the charge/discharge cycles, which is caused as a phenomenon unique to a prismatic lithium rechargeable battery, was also measured in mm in comparison with the initial state.

Charge: constant current/constant voltage system, a current of 0.7 C (560 mA), a charge control voltage of 4.2 V, total charge time of 2.5 hours, Pause after charge: 30 minutes Discharge: a constant current of 0.7 C (560 mA), a discharge cut voltage of 3.0 V Pause after discharge: 30 minutes Atmospheric temperature: 20° C.

The evaluation results are shown in Table 3. Values obtained from the battery "a" were regarded as reference values of 100 for making comparison with the performance of the batteries "b" to "v".

The results show that the batteries "a" to "d" of the present invention were clearly superior to the batteries "q" to "v" using the natural graphite-based negative electrodes in every characteristic. Further, as compared with the batteries "e" to "p" using the artificial graphite-based negative electrodes, the batteries "a" to "d" were superior in high rate discharge characteristic, discharge characteristic at low temperature and the degree of capacity maintenance after the 500th cycle, even though they had a defect of slightly large irreversible capacity. Moreover, the swelling of the battery was also inhibited to a sufficient degree.

trode resistance) of the negative electrode material mixture. Regarding the artificial graphite particles A1 and A2 used in the batteries "a" to "d" of the present invention, the base material thereof, i.e., bulk mesophase pitch, can easily be graphitized as compared with needle-like coke and their graphite crystal structures are fully developed through the graphitization step. Therefore, the electronic conductivity of the particles themselves is high as compared with the graphite particles C1 and C2 derived from needle-like coke (used in the batteries "e" to "j"). Further, the particles A1 and A2 are massive to a moderate degree as compared with the mesophase carbon-derived artificial graphite particles D (graphitized milled-MCF in the form of a narrow column) used in the batteries "k" and "l" and the graphite particles E (graphitized MCMB in the spherical form) used in the

TABLE 3

| Battery | Initial irreversible capacity | High rate discharge characteristic | Discharge characteristic at low temperature | Cycle life characteristic | |
|---|---|---|---|---|---|
| | | | | Degree of capacity maintenance | Degree of swelling of battery case |
| Battery a (present invention) | 100 (reference) | 100 (reference) | 100 (reference) | 100 (reference) | 100 (reference) |
| Battery b (present invention) | 98 | 101 | 102 | 103 | 98 |
| Battery c (present invention) | 99 | 102 | 101 | 101 | 101 |
| Battery d (present invention) | 99 | 104 | 103 | 103 | 99 |
| Battery e (comparative example) | 95 | 95 | 89 | 91 | 128 |
| Battery f (comparative example) | 96 | 97 | 90 | 92 | 129 |
| Battery g (comparative example) | 94 | 98 | 88 | 93 | 125 |
| Battery h (comparative example) | 98 | 98 | 91 | 92 | 123 |
| Battery i (comparative example) | 99 | 99 | 89 | 91 | 120 |
| Battery j (comparative example) | 97 | 100 | 90 | 92 | 117 |
| Battery k (comparative example) | 98 | 98 | 92 | 98 | 121 |
| Battery l (comparative example) | 96 | 98 | 91 | 98 | 118 |
| Battery m (comparative example) | 92 | 100 | 93 | 82 | 144 |
| Battery n (comparative example) | 91 | 99 | 92 | 83 | 139 |
| Battery o (comparative example) | 104 | 94 | 91 | 85 | 155 |
| Battery p (comparative example) | 105 | 95 | 89 | 86 | 150 |
| Battery q (comparative example) | 130 | 95 | 99 | 62 | 238 |
| Battery r (comparative example) | 133 | 93 | 98 | 65 | 215 |
| Battery s (comparative example) | 128 | 92 | 100 | 66 | 209 |
| Battery t (comparative example) | 112 | 97 | 100 | 81 | 185 |
| Battery u (comparative example) | 111 | 98 | 101 | 82 | 165 |
| Battery v (comparative example) | 115 | 95 | 100 | 85 | 172 |
| Remarks | Larger value corresponds to larger irreversible capacity | Larger value corresponds to better high rate discharge characteristic | Larger value corresponds to better discharge at low temperature | Larger value corresponds to better capacity maintenance | Larger value corresponds to higher degree of swelling |

It is considered that the superiority of the batteries "a" to "d" of the present invention to the other batteries is greatly dependent on the powder properties of the artificial graphite particles A used as the main negative electrode active material. The superiority in high rate discharge characteristic is considered as being resulted from the fully developed graphite crystal in the artificial graphite particles A1 and A2 oriented at random owing to the manufacture process (powder property value: the ratio $I_{002}/I_{110}$ is sufficiently small). That is, even if part of the graphite particles in the negative electrode material mixture layer having as high density as 1.70 g/cm$^3$ (including the weights of CMC and SBR) is oriented in a plane direction of the copper core material, the graphite crystals present at random in the particles are not affected, thereby maintaining a state that allows smooth intercalation and deintercalation of Li ions between the graphite particles and the electrolyte.

The discharge characteristic at low temperature is considered as being controlled by electronic conductivity (elecbatteries "m" and "n". Therefore, contact points between the particles A1 or A2 and the graphite particles B1 or B2 are increased, which enhances the electronic conductivity of the negative electrode material mixture. As a result, the reduction of the discharge voltage is not caused to a great extent during discharge at low temperature, thereby maintaining excellent discharge characteristic at low temperature. Regarding the difference in discharge characteristic at low temperature between the batteries "a" to "d" and the batteries "o" and "p" using the artificial graphite particles F (graphitized bulk mesophase pitch), it is considered as greatly depending on the existence of the graphite crystal oriented at random in the particles A1 and A2 as mentioned in terms of the high rate discharge characteristic.

As apparent from Table 3, there is no great difference in performance between the battery "e" using only the comparative artificial graphite particles C1 and the batteries "f" and "g" using the mixture of the comparative artificial graphite particles C1 and the spherical graphite particles B1 or B2. This signifies that the effect of the present invention cannot be obtained by using the comparative artificial graphite particles C1 in place of the artificial graphite particles A1 or A2. In other words, the negative electrode and the battery having particularly excellent characteristics are obtained only when the artificial graphite particles A1 or A2 and the spherical graphite particles B1 or B2 are combined.

In the manufacture of the negative electrode of the battery "e" using only the comparative artificial graphite particles C1, it is assumed that fine powder of artificial graphite is generated while rolling the artificial graphite particles, and the powder functions like the spherical graphite particles B1 or B2. Therefore, characteristic difference was not shown between the battery "e" and the batteries "f" and "g". As the reason why the fine artificial graphite powder is generated, considered is that the preparation of the comparative artificial graphite particles C1 includes the step of pulverizing graphite, and hence coupling of primary particles is lowered.

The batteries "a" to "d" of the present invention are superior to the other batteries in charge/discharge cycle characteristic and in preventing the swelling of the battery accompanying the charge and discharge. The causes of this are considered as follows.

(1) In the negative electrode active material particles "a" to "d" used in the batteries "a" to "d" of the present invention, the spherical graphite particles B1 or B2 are optimally existed to fill space in the artificial graphite particles A1 or A2. Accordingly, even if the negative electrode material mixture is rolled to have as high density as 1.70 g/cm$^3$, the graphite particles in the vicinity of the surface of the negative electrode material mixture layer are not crushed or collapsed to be oriented in the plane direction of the copper core material. Therefore, the permeability of the mixture layer to the electrolyte is not deteriorated. That is, since the electrolyte surely permeates into the inside of the mixture layer, the charge/discharge reaction occurs smoothly even if part of the electrolyte is decomposed or reduced during repeated charge/discharge cycles.

(2) Since the graphite crystal in the artificial graphite particles A1 and A2 are oriented at random, the particles are less expanded or contracted during repeated charge/discharge cycles (intercalation and deintercalation of Li ions), and hence the degree of increase in thickness of the negative electrode (swelling) is small.

(3) Since the artificial graphite particles A1 and A2 cause less expansion and contraction during repeated charge/discharge cycles as mentioned in the above item (2), the graphite particles are resistant to cracking during the charge/discharge cycles. Therefore, decomposition and consumption of the electrolyte, which are caused in response to the cracking of the graphite particles (due to an exposed edge surface of the graphite particles) and accompanied by generation of gas, are inhibited.

(4) In the preparation of the artificial graphite particles A1 and A2, the pulverized bulk mesophase pitch is granulated together with pitch or thermosetting resin and graphitized, which alters the wettability of the particle surface (the wettability depends on the kind and concentration of a surface functional group). Thereby, the ability of accepting the Li ions during high rate charge, which is generally low in the mesophase carbon-derived artificial graphite particles, is improved to a relatively high extent. Accordingly, deposition of metallic lithium on the negative electrode surface through the charge/discharge cycles is inhibited.

Detailed mechanism remains unclear as to the reason why the batteries "a" to "d" of the present invention are superior in charge/discharge cycle characteristic to the batteries "e" to "j" using the comparative artificial graphite particles C1 and C2 which are similar to the artificial graphite particles A1 and A2 in manufacturing process. However, the following points are worthy of attention.

(5) In the preparation of the artificial graphite particles A1 and A2, pulverization is not performed after the carbonization and graphitization steps, and therefore the artificial graphite particles A1 and A2 maintain a high mean circularity and a high tap density. The particles A1 and A2, even if rolled to form a high density negative electrode, are less crushed than the artificial graphite particles C1 and C2 rolled to form high density negative electrodes "e" to "j".

(6) Due to the difference between the base materials (pulverized bulk mesophase pitch and needle-like coke), the artificial graphite particles A1 and A2 are smaller in the degree of cracking through the charge/discharge cycles mentioned in the above items (2) and (3) than the artificial graphite particles C1 and C2. This is suggested by data obtained by an experiment performed with respect to the batteries "a" to "d" and the batteries "e" to "j", in which the negative electrode material mixture of the battery (discharge state) was extracted and washed after the 10th cycle and the 500th cycle to measure the specific surface area of the active material particles by a BET method. It was confirmed by the data that the batteries "a" to "d" (negative electrodes "a" to "d") had smaller specific surface area than the batteries "e" to "j" (negative electrodes "e" to "j") from the initial state, and showed smaller increase in specific surface area through the repeated charge/discharge cycles.

(Safety Test)

In view of safety, it is generally considered that a graphite negative electrode of a lithium rechargeable battery has a close correlation with thermal stability of the battery. There are various standards and guidelines for evaluation methods and evaluation criteria for the thermal stability of a lithium rechargeable battery, though they are not unified. In the present invention, however, heat resistance test was performed under relatively severe conditions as described below so as to make the difference among the negative electrodes as clear as possible.

First, 22 lithium rechargeable batteries including the negative electrodes "a" to "v", respectively, were charged to 4.3 V at an atmospheric temperature of 20° C. and at a charge rate of a constant current of 0.1 C (80 mA) and held at the constant voltage for 2 hours. Then, a thermocouple was attached to each battery to allow monitoring of the surface temperature and the battery was suspended in midair in a thermostatic bath at an atmospheric temperature of 20° C., and then the temperature in the thermostatic bath was raised to 165° C. at the increasing rate of 5° C./minute and maintained at 165° C.

In this test, even if the temperature in the thermostatic bath is maintained at 165° C., the battery surface temperature reaches 165° C. or higher because part of the graphite particles as the negative electrode active material under the charged state causes reaction with an electrolyte and a binder or decomposition of the coating film on the surface of the graphite particles. If the maximum battery temperature reaches extremely high, chain exothermic reaction (thermal runaway reaction) occurs in the negative electrode (or positive electrode) in the battery or an internal short circuit is caused by abrupt contraction of a separator. From this point of view, it is considered that the battery which is lower in the maximum temperature in this test offers greater safety. Table 4 shows the experiment results.

TABLE 4

| Battery | Maximum battery temperature (° C.) |
| --- | --- |
| Battery a (present invention) | 169 |
| Battery b (present invention) | 169 |
| Battery c (present invention) | 169 |
| Battery d (present invention) | 168 |
| Battery e (comparative example) | 178 |
| Battery f (comparative example) | 179 |
| Battery g (comparative example) | 177 |
| Battery h (comparative example) | 179 |
| Battery i (comparative example) | 183 |
| Battery j (comparative example) | 181 |
| Battery k (comparative example) | 177 |
| Battery l (comparative example) | 176 |
| Battery m (comparative example) | 175 |
| Battery n (comparative example) | 174 |
| Battery o (comparative example) | 175 |
| Battery p (comparative example) | 174 |
| Battery q (comparative example) | 184 |
| Battery r (comparative example) | 188 |
| Battery s (comparative example) | 187 |
| Battery t (comparative example) | 175 |
| Battery u (comparative example) | 181 |
| Battery v (comparative example) | 180 |

From the results, it is understood that whether or not the ignition of the battery occurs in the heat resistance test has a very close correlation with the BET specific surface area of the graphite particles in the negative electrode. Further, the negative electrodes used in the batteries "a" to "d" of the present invention are highly advantageous in terms of heat resistance because the active material graphite particles A1 and A2 each have a BET specific surface area of not more than 1 $m^2/g$, i.e., 0.4 to 0.5 $m^2/g$. The BET specific surface area of the spherical graphite particles B1 and B2 used in the negative electrodes of the batteries "a" to "d" is as considerably large as 6.9 to 7.2 $m^2/g$, which is more preferable if reduced as much as possible.

From the above-mentioned analysis results, it is confirmed that the batteries "a" to "d" of the present invention have high discharge characteristic and excellent cycle life characteristic, as well as high safety. In Example, the electrode group in the almost rectangular column shape was inserted in the prismatic battery case made of an aluminum alloy (FIG. 1). However, the present invention is not limited thereto. For example, the electrode group wound in the almost rectangular column shape or the elliptic cylinder shape may be sealed in an aluminum foil/resin film laminate case with a non-aqueous electrolyte injected therein. Even with this structure, the high energy density lithium rechargeable battery can be obtained with excellent discharge characteristic, cycle life characteristic and safety, as well as features of "thin and lightweight". Or alternatively, the negative electrode material mixture layer may be formed to have a high density of 1.6 to 1.8 $g/cm^3$ and wound into an electrode group in a cylindrical (spiral) shape in combination with a high density positive electrode and a separator so that the electrode group can be accommodated in a cylindrical case made of nickel-plated steel sheet with a non-aqueous electrolyte injected therein. Even with this structure, the resulting lithium rechargeable battery is excellent in discharge characteristic, cycle life characteristic and safety, and has a capacity as high as 400 Wh/L.

In the present examples, the pulverized bulk mesophase pitch having an average particle diameter of 13 μm was used as the base material for forming the artificial graphite particles A1 or A2. However, the present invention is not limited thereto and the pulverized bulk mesophase pitch having an average particle diameter of about 7 to 20 μm may be used to obtain similar artificial graphite particles. The coal tar pitch (coal pitch) and phenol resin used as the binder may be replaced with other pitches such as petroleum pitch and naphthalene pitch and thermosetting resins such as polyimide resin, polyvinyl chloride resin, cellulose resin and furfuryl alcohol resin. In the kneading and granulating step, the base material and the binder was kneaded and granulated in the mixing ratio of 85:15 (by weight) using a Z-shaped kneader at 200° C. for 120 minutes. However, the present invention is not limited to these conditions. The conditions may be adjusted as long as the resulting granules have the mean circularity of 0.85 to 0.95, the average particle diameter $D_{50}$ of 15 to 30 μm and the ratio $D_{10}/D_{90}$ of 0.2 to 0.5. The temperature for carbonizing (calcining) the granules was set at 800° C., but the carbonization may be carried out at least in a nonoxidative atmosphere at 700 to 1,500° C. The graphitizing temperature was set at 2,950° C., but similar artificial graphite particles can be obtained by heating the granules to be graphitized sufficiently at 2,500 to 3,000° C. in a nonoxidative atmosphere.

As the spherical graphite particles, used were the particles B1 which were prepared by making pulverized flake-like natural graphite into spherical shape by giving impact thereto in a counter jet mill, followed by classification, as well as the particles B2 made of needle-like coke powder which is graphitized, made into spherical shape and classified. However, the spherical graphite particles of the present invention are not limited thereto. If natural graphite is used as a starting material, it is preferable because the maximum reversible capacity is obtained and the graphitization step is omitted, making the resulting particles inexpensive. Not only by the method of giving impact in the counter jet mill, the spherical graphite particles having $D_{50}$ of 5 to 15 μm and a high mean circularity of 0.88 to 1 can be obtained by improving the apparatus and conditions for pulverizing crude ore. In view of safety (heat resistance) of the graphite negative electrode, the spherical graphite particles preferably have a BET specific surface area reduced as much as possible. Therefore, the spherical graphite particles subjected to surface reforming treatment (coating treatment) are the most suitable.

In the preparation of the negative electrode active material, the content of the spherical graphite particles B1 or B2 in the active material was set to 25 wt %. However, the same effect can be obtained as long as the content of the spherical graphite particles B1 or B2 is in the range of 5 to 45 wt %. In the preparation of the negative electrode material mixture, styrene butadiene rubber (SBR) was used as the rubber-like binder. However, a similar negative electrode can be formed by using, as a similar rubber-like binder based on a butadiene derivative, a rubber-like polymer made of a copolymer of butadiene, an aromatic vinyl monomer and an ethylenic unsaturated carboxylic acid ester monomer. Examples of the aromatic vinyl monomer include styrene and α-methyl styrene and examples of the ethylenic unsaturated carboxylic acid ester monomer include acrylates (methyl acrylate, ethyl acrylate and propyl acrylate) and methacrylates (methyl methacrylate, ethyl methacrylate and propyl methacrylate).

The addition amount of the rubber-like binder was 2 wt % with respect to the weight of the negative electrode active material. However, for example, with the addition amount of 3 wt % or less, a battery can be manufactured without deteriorating the negative electrode characteristics. The negative electrode was formed by rolling the negative electrode material mixture layer to have a density of 1.7 $g/cm^3$ and a thickness of 70 μm. However, a lithium rechargeable battery having similar characteristics can be obtained as long as the negative electrode material mixture has a density in the range of 1.6 to 1.8 g/cm$^3$ and a thickness in the range of 40 to 100 μm.

The non-aqueous electrolyte used in the present invention was prepared as a solution dissolving LiPF$_6$ in the concentration of 1.0 M in a solvent of ethylene carbonate (EC), ethyl methyl carbonate (EMC) and diethyl carbonate (DEC) mixed in the volume ratio of 1:2:1. However, the present invention is not limited thereto.

As described above, according to the present invention, a lithium rechargeable battery of high energy density is greatly improved in charge/discharge cycle characteristic. Thereby, is provided a battery excellent in discharge rate characteristic, discharge characteristic at low temperature and safety (heat resistance). Thus, the present invention has great value in industry.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium rechargeable battery comprising a positive electrode, a negative electrode and a non-aqueous electrolyte,
   wherein said negative electrode comprises a copper core material and a negative electrode material mixture layer fixed on said core material,
   said negative electrode material mixture layer includes an active material comprising a mixture of artificial graphite particles A and spherical graphite particles B,
   said artificial graphite particles A are isotropic artificial graphite particles including graphite structure oriented at random and having:
   (1) an interplanar spacing d$_{002}$ between the (002) planes obtained by a powder X-ray diffraction method being not more than 3.362 Å;
   (2) a ratio I$_{002}$/I$_{110}$ of the peak intensity I$_{002}$ attributed to the (002) plane to the peak intensity I$_{110}$ attributed to the (110) plane, which are found from a diffraction pattern obtained by X-ray diffraction of said artificial graphite particles A molded into a pellet of 1.6 g/cm$^3$ in density, being not more than 1,000;
   (3) a mean circularity of the particles being 0.85 to 0.95;
   (4) a particle diameter D$_{50}$ corresponding to a volume fraction of 50% measured by a laser diffraction particle size distribution analyzer being 15 to 30 μm, and a ratio D$_{10}$/D$_{90}$ of a particle diameter D$_{10}$ corresponding to a volume fraction of 10% to a particle diameter D$_{90}$ corresponding to a volume fraction of 90% being 0.2 to 0.5;
   (5) a tap density after tapping of 900 times with a stroke length of 18 mm being not less than 1 g/cm$^3$; and
   (6) a specific surface area measured by a BET method being not more than 1 m$^2$/g, and
   said spherical graphite particles B having:
   (1) a mean circularity of the particles being 0.88 to 1;
   (2) a particle diameter D50 corresponding to a volume fraction of 50% measured by a laser diffraction particle size distribution analyzer being 5 to 15 μm;
   (3) an interplanar spacing d002 between the (002) planes obtained by a powder X-ray diffraction method being not more than 3.357 Å; and
   (4) a specific surface area measured by a BET method being not more than 8 m$^2$/g.

2. The lithium rechargeable battery in accordance with claim 1, wherein said artificial graphite particles A are obtained by kneading and granulating a base material of pulverized bulk mesophase pitch with pitch in a softened state and/or thermosetting resin, carbonizing the resulting granules at 700 to 1,500° C. and graphitizing the carbonized granules at 2,500 to 3,000° C.

3. The lithium rechargeable battery in accordance with claim 1, wherein the content of said spherical graphite particles B in said active material is 5 to 45 wt %.

4. The lithium rechargeable battery in accordance with claim 1, wherein said positive electrode and said negative electrode with a separator interposed therebetween are wound to form an electrode group, said electrode group being accommodated and sealed in a prismatic metal case or a case made of a laminate of an aluminum foil and a resin film.

5. The lithium rechargeable battery in accordance with claim 1, wherein said negative electrode material mixture layer further includes a rubber-like binder containing a butadiene unit and a cellulose-based thickener.

6. The lithium rechargeable battery in accordance with claim 1, wherein said spherical graphite particles B are natural graphite particles and/or natural graphite particles partially subjected to reforming treatment to make only their surfaces amorphous.

7. The lithium rechargeable battery in accordance with claim 5, wherein said rubber-like binder is added in an amount of not more than 3 parts by weight with respect to said active material of 100 parts by weight, and said negative electrode material mixture layer has a density of 1.6 to 1.8 g/cm$^3$ and a thickness of 40 to 100 μm.

* * * * *